United States Patent Office 2,711,398
Patented June 21, 1955

2,711,398

ANHYDROUS FORMIC ACID SOLUTIONS OF POLYPYRROLIDONE

Carl E. Barnes, Gloucester, William O. Ney, Jr., Providence, and William R. Nummy, Warren, R. I., assignors to Arnold, Hoffman & Co., Incorporated, Providence, R. I., a corporation of Rhode Island No Drawing. Application February 24, 1953,
Serial No. 338,553

6 Claims. (Cl. 260—31.2)

The present invention relates to polymer compositions and, more particularly, to new and useful compositions containing polypyrrolidone.

The principal object of the invention is the provision of highly useful solutions of polypyrrolidone. Another and more specific object of the invention is to provide polypyrrolidone solutions which are particularly adapted for the production of improved polypyrrolidone films and fibers, although suitable for a variety of other uses. Further objects will appear hereinafter.

The foregoing objects are realized, according to the present invention, by virtue of the discovery that solutions of polypyrrolidone in at least substantially anhydrous formic acid, and containing by weight not more than three parts of formic acid per part of polypyrrolidone, possess, among other desirable characteristics, exceptionally attractive fiber and film forming properties. As indicated, the solutions of the invention must contain not more than three parts of formic acid for each part of polypyrrolidone, i. e., at least 25% by weight of the polymer-formic acid solution must be polypyrrolidone, otherwise satisfactory films and fibers cannot be obtained therefrom. Except for the above-stated limitation, which is critical to success of the invention, the quantity of polypyrrolidone may be varied over wide limits. Generally speaking, however, a practical lower limit of about 1.2 parts of formic acid for each part of polymer is observed with a preferred concentration of 1.5 parts formic acid to each part of polymer.

Polypyrrolidone possessing film and fiber forming characteristics suitable for use in the present invention is described in the copending application of Ney, Nummy and Barnes, Serial No. 260,558, filed December 7, 1951, now issued as U. S. Patent 2,638,463 of May 12, 1953, and can be prepared according to the procedures described therein. Polypyrrolidone of widely varying molecular weight can be used according to the invention but, to obtain films and fibers possessing most desirable characteristics, the polymer should have a molecular weight corresponding to a relative viscosity falling within the range of 2 to 10, as determined by the relative viscosity of a 1% solution thereof in metacresol. For best results, the polypyrrolidone utilized should have a relative viscosity of between 3.0 and 6.0.

The formic acid used for dissolving the polypyrrolidone must be anhydrous, or at least substantially so, e. g., 98 to 100%. Dissolution of the polypyrrolidone in the acid can be effected in any convenient manner, e. g., by simply mixing the polymer and solvent together, preferably while heating to a temperature of 30° C. to 50° C., although heat is not essential.

It will be understood that various other auxiliary agents, normally used by those skilled in the art to modify the properties of film and fiber forming compositions, may be incorporated in the solutions of the invention. Typical of such modifying agents are pigments, fillers, dyes and synthetic resins.

As indicated above, the present compositions are particularly useful in the production of films which are characterized by their extreme toughness, flexibility, water-permeability and ready dyeability. Such films may be obtained, using any of the conventional procedures for forming polymer films or coatings, such as casting, dipping, extruding or spraying with subsequent removal of the solvent. As will be appreciated, the resulting products are suitable for a wide variety of uses, for example, as dialyzers or in food packaging. In addition, the products of the invention may be used as spinning solutions in conventional wet and dry spinning procedures for producing tough and otherwise desirable polypyrrolidone filaments and fibers capable of being cold drawn or two-way stretched. Such spinning solutions may have included therein conventional fiber-modifying agents, for example, dyestuffs of desired shade by which dyeing in the mass may be effected. Other uses for the solutions of the invention include their application as coatings for natural or synthetic fibers and filaments, e. g., nylon, cotton, wool, rayon, glass and the like, as such, or in fabric form, and aqueous dispersions and emulsions prepared with the aid of appropriate dispersing or emulsifying agents for use as textile assistants and the like.

The invention, as above-described, is further illustrated, but not limited, by the following examples, wherein parts are by weight.

*Example I*

This example illustrates the undesirable results obtained using more formic acid than that called for in the present invention for dissolution of the polypyrrolidone.

One part of polypyrrolidone (relative viscosity of 4 for a 1% solution in meta-cresol) is dissolved in four parts of anhydrous formic acid (98 to 100%). The resulting solution was cast on glass plate and allowed to dry at room temperature. The thin foil obtained was opaque and so weak that only with difficulty could it be removed from the glass without tearing.

*Example II*

In the manner of Example I, one part of polypyrrolidone, having the same relative viscosity, was dissolved in three parts of anhydrous formic acid. From this solution there was obtained a slightly opaque but extremely tough and otherwise satisfactory foil of polypyrrolidone.

*Example III*

Following the procedure of Example I, a solution of two parts of polypyrrolidone was dissolved in three parts of anhydrous formic acid. On casting this solution using a doctor blade, extremely tough films were obtained.

On dry spinning, this solution gave filaments which could be cold drawn to fibers having a tenacity of 2.5 g. per denier. A substantially similar product was obtained by spinning into water or methanol.

Similar solutions made from other polypyrrolidone having relative viscosity of 3 and 5 for their 1% solution in meta-cresol gave strong, tough films and fibers.

*Example IV*

Filaments were dry spun from the solution of Example III modified to include a formic acid-soluble dyestuff, such as the acid dyestuff Alizarine Cyanine Green 2G Ex (Color Index 1078), and the basic dyestuff Rhodamine B (Color Index 749). The results were evenly dyed and otherwise desirably colored filaments.

As many apparently widely different embodiments of this invention may be made without departing from the spirit and scope thereof, it is to be understood that the invention is not limited to the specific embodiment thereof except as defined in the appended claims.

We claim:
1. A composition of matter comprising polypyrrolidone dissolved in at least substantially anhydrous formic acid, said composition containing, in parts by weight, not more than three parts of formic acid per part of polypyrrolidone.
2. A composition as claimed in claim 1 wherein the polypyrrolidone has a relative viscosity of from 2.5 to 10.
3. A composition as claimed in claim 2 wherein the polypyrrolidone has a relative viscosity of from 3.0 to 6.0.
4. A composition of matter suitable for the production of films and fibers therefrom, said composition comprising polypyrrolidone having a relative viscosity of between 3.0 and 6.0 dissolved in from 1.20 to 3 parts, by weight, of at least substantially anhydrous formic acid per part of polypyrrolidone.
5. A composition as claimed in claim 4 containing 1.5 parts of formic acid per part of polypyrrolidone.
6. A process for producing polypyrrolidone films and the like which comprises applying to a base material a solution of polypyrrolidone in at least substantially anhydrous formic acid, the solution containing, by weight, not more than three parts of formic acid per part of polypyrrolidone and removing the acid solvent.

References Cited in the file of this patent
UNITED STATES PATENTS

| | | |
|---|---|---|
| 2,404,721 | Houtz | July 23, 1946 |
| 2,638,463 | Ney et al. | May 12, 1953 |